United States Patent [19]

Higgins et al.

[11] Patent Number: 5,238,358
[45] Date of Patent: Aug. 24, 1993

[54] VEHICLE SPARE TIRE STORAGE AND RETRIEVAL APPARATUS

[76] Inventors: Betty W. Higgins; Wilson P. Higgins, both of 912 Dumont Dr., Hillsborough, N.C. 27278

[21] Appl. No.: 888,134

[22] Filed: May 26, 1992

[51] Int. Cl.$^5$ .............................................. B62D 43/00
[52] U.S. Cl. .................................. 414/463; 224/42.21; 224/42.23
[58] Field of Search ............... 414/463, 464, 477, 558; 224/42.21, 42.23

[56] References Cited

U.S. PATENT DOCUMENTS

| | | | |
|---|---|---|---|
| 3,435,971 | 4/1969 | Powell | 414/463 |
| 3,494,493 | 2/1970 | Fowler | 414/466 |
| 4,278,191 | 7/1981 | Mecham | 414/466 X |
| 4,573,855 | 3/1986 | Braswell | 414/463 |
| 4,711,382 | 12/1987 | Helterbrand | 414/466 X |
| 5,022,573 | 6/1991 | Barkouskie | 224/42.21 |

Primary Examiner—Robert P. Olszewski
Assistant Examiner—Cheryl L. Gastineau
Attorney, Agent, or Firm—Olive & Olive

[57] ABSTRACT

The invention comprises a hinged ramp adapted to have its non-hinged end lowered and raised beneath the body of a vehicle by a pulley system. The ramp supports a tire carriage which is configured to hold a spare tire and to slide downwardly along the ramp when the ramp is in an angled, lowered position. At the extreme end of the downward slide, the tire carriage and the spare tire are in a position beneath and behind the vehicle chassis so as to be easily moved by the vehicle user.

10 Claims, 5 Drawing Sheets

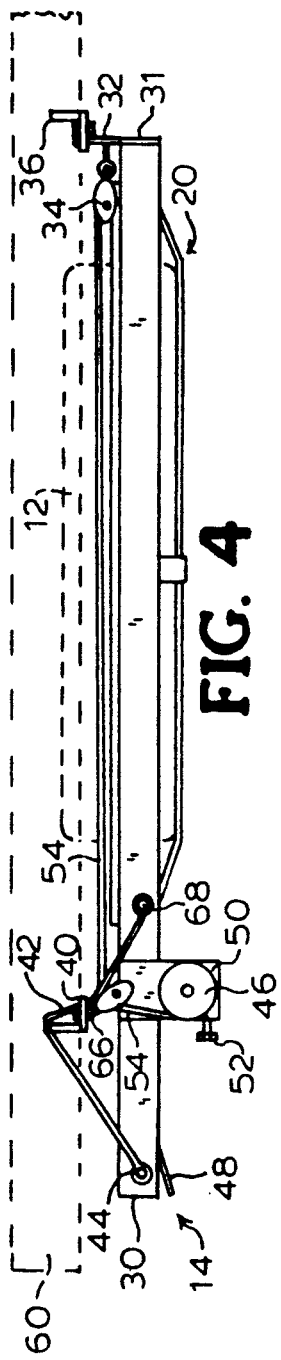
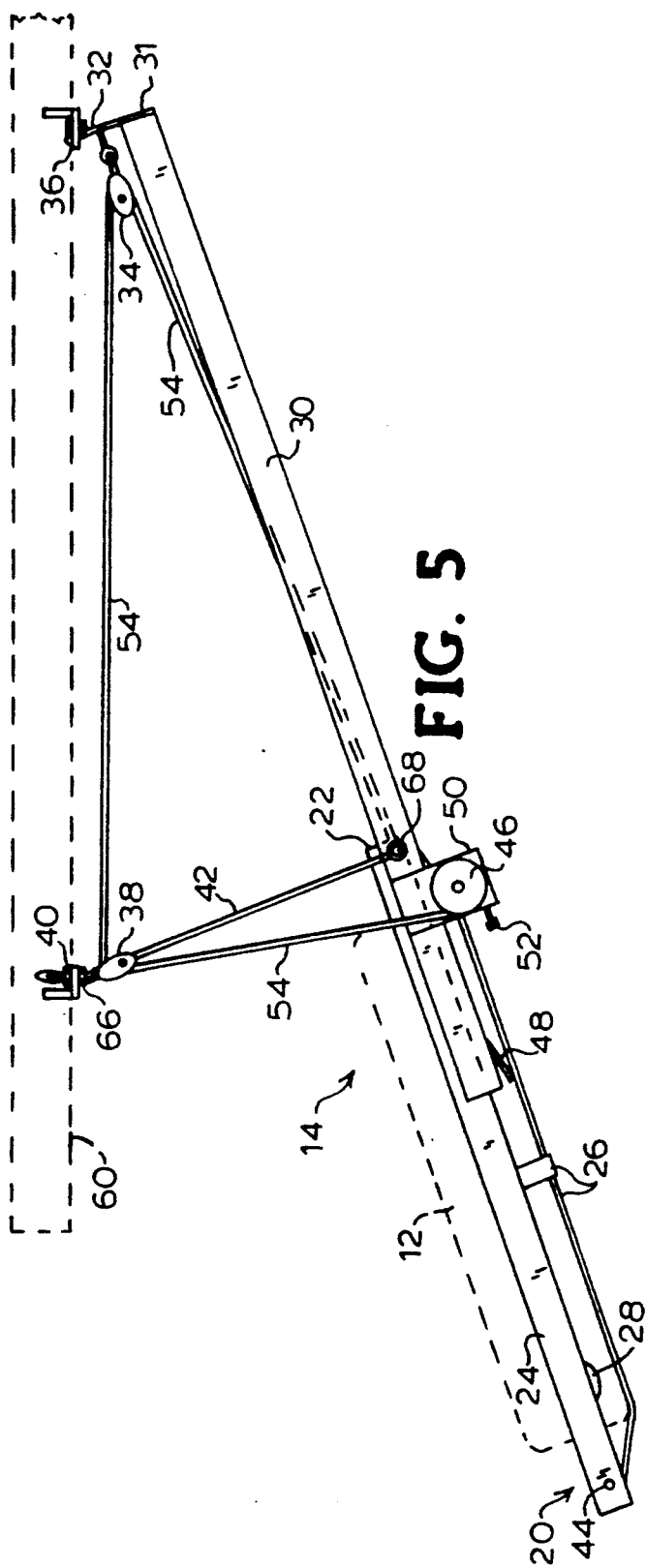

VEHICLE SPARE TIRE STORAGE AND RETRIEVAL APPARATUS

FIELD OF THE INVENTION

This invention relates to the field of vehicles, and more particularly to the field of spare tire storage apparatus.

BACKGROUND OF THE INVENTION

In the interest of saving space within the walls and compartments of a vehicle, certain types of vehicles have typically stored the spare tire externally. This is particularly true in the cases of trucks, recreational vehicles and motor homes. Large trucks generally have a sizeable space beneath the frame into which a tire can be comfortably stored, and into which a user can easily reach when handling the tire. Smaller trucks and motor homes do not have this space option since their bodies are closer to the ground. Therefore, storing the tire beneath the medium sized truck or motor home is done in a relatively small space.

When a user of a motor home, for example, wishes to utilize the spare tire which is stored under the truck, it is frequently necessary for the user to lie on the ground and unscrew a bolt securing the tire to the undercarriage of the vehicle. Some vehicles are equipped with a spare tire storage frame that is hinged to the vehicle at a forward end so that releasing the securing bolt will allow the frame to be lowered at the rear end. Nonetheless, it is necessary to get under the vehicle to remove the bolt and support the tire as it is lowered and raised, as well as to extract the tire from its under-vehicle location by hand.

Some motor homes and medium sized trucks have a rear bumper mounted spare tire holder, where the spare tire is more accessible than if stored beneath the vehicle. However, to remove a spare tire from such a holder, the user must lift the tire which may weigh more than 60 pounds.

An advance has been made as taught in U.S. Pat. No. 4,537,555 to Combs for a Wire Rope Spare Tire Carrier. This patent deals with a device for lowering the spare tire from its under-vehicle storage position by means of a lever actuated wire rope. The user must then reach in beneath the vehicle and pull the tire and the rope out to where the tire is free of the vehicle and available for use.

As is now well understood all devices known to date for tire storage and retrieval have required some form of operator work under the vehicle and a fair amount of operator strength. This mode of use may be reasonably acceptable in the case of commercial trucks where the operator is expected to occasionally get dirty and exert this sort of effort. However, a large proportion of operators of motor homes are using the vehicle for pleasure, not work. The option of accessing the spare tire by this existing method tends to make retrieving and restoring the spare tire an unpleasant and dirty experience. In addition, the possibility of injury due to the strain of lowering or lifting a spare tire or of contact with sharp or hot underbody parts, makes this retrieval potentially dangerous.

Therefore, it is an objective of the present invention to provide a spare tire storage device which does not require the user to work under the vehicle in order to store or retrieve the tire.

It is an additional objective of the invention to provide a spare tire storage device which enables the spare tire to be loaded and unloaded with a minimum possibility of injury or physical exertion by the user.

It is a further objective of the invention to provide a spare tire storage device which will adapt to the undercarriage of a variety of existing vehicles.

It is a still further objective of the invention to provide a spare tire storage device which will handle a variety of tire sizes.

These and additional objectives will become apparent to those skilled in the art as the description proceeds.

SUMMARY OF THE INVENTION

The invention disclosed herein provides an apparatus for the storage of a spare tire beneath the body of a vehicle in a manner enabling the tire to be easily and safely inserted and retracted. The invention apparatus for holding the spare tire is supported at its forward end by hinges and at its rearward end by cables. Means are provided for gradually releasing the cables and first lowering the rear end of the apparatus to a stopping point and then allowing a tire carrying carriage, on which the spare tire is stored, to slide down an angled ramp to bring the tire below the vehicle chassis and rearward of the bumper so as to be easily removed. Reversal of the process stores the tire for future use.

BRIEF DESCRIPTION OF THE DRAWINGS

FIG. 4 is a side elevation view of the tire storage apparatus of the invention in its upper, stored position and supported from a portion of vehicle chassis shown in dashed lines.

FIG. 5 is a side elevation view of the apparatus of the invention in its lower, extended position and supported from a portion of vehicle chassis shown in dashed lines.

DESCRIPTION OF PREFERRED EMBODIMENT

The spare tire storage apparatus of the invention generally improves tire accessibility and reduces the possibility of injury to and the effort required of the vehicle user when removing or replacing a spare tire. The apparatus is adapted to be built into a new vehicle or to be added to an existing vehicle. The apparatus of the invention is generally applicable to any vehicle of the type in which storage room is available between a pair of chassis members and beneath the floor.

Figure 1:
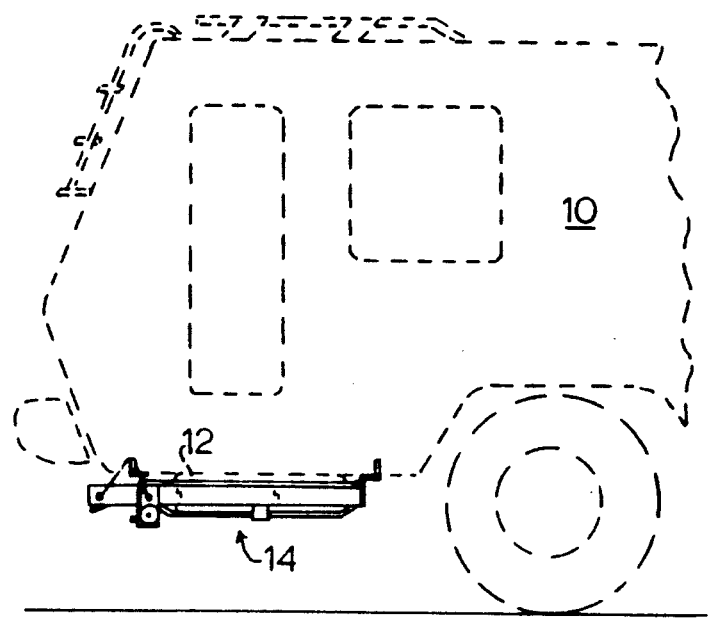
FIG. 1 is a side elevation view of the tire storage apparatus of the invention installed on a vehicle, shown in partial view in dashed lines, and with the apparatus in its upper, tire storage position.

A typical installation of the tire storage apparatus 14 of the invention is illustrated on a vehicle 10 (in dashed lines) in FIG. 1. A motor home is used in the drawings by way of example. As shown, tire 12 (in dashed lines) is held in its stored position on tire storage apparatus 14 and apparatus 14 is supported beneath vehicle 10 with a pair of safety cables 42, 42' (only one being shown in FIG. 1) securely latched over rear support bar 40. In this position, tire 12 rides safely stored well off the ground and does not occupy space within the body of the vehicle 10.

Figure 2:
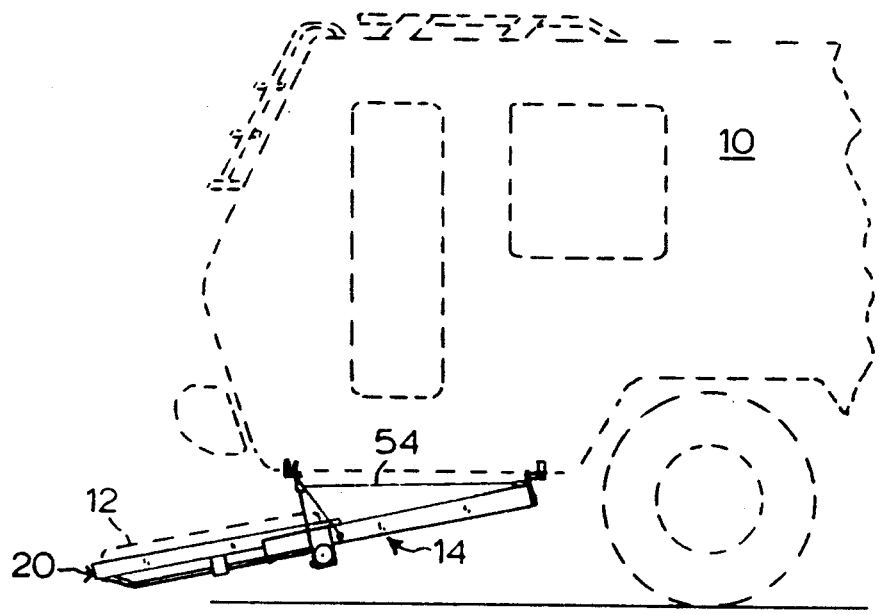
FIG. 2 is an elevation partial side view of the vehicle in dashed lines with the apparatus of the invention mounted thereon and in a lowered and extended position.

The alternate position of the tire storage apparatus 14 is illustrated in FIG. 2, showing the apparatus 14 lowered and extended to a location rearward of the rear extremity of vehicle 10 so as to make tire 12 access simple. As seen in this figure, the tire 12 is removable from tire carriage 20 by lifting the rear end of tire 12. It is not necessary to reach under the vehicle 10 or to lift the whole tire 12. The transition from tire retracted position as seen in FIG. 1 to lowered, tire extended position as seen in FIG. 2 is accomplished by means of a pulley and cable system as next described.

The illustrations are directed to mounting tire storage apparatus 14 in a location and orientation to be accessible from the rear of the vehicle according to the preferred embodiment. It is nonetheless possible to position the apparatus of the invention in other locations and orientations so as to accommodate the configuration of the vehicle on which it is being mounted.

Figure 3:
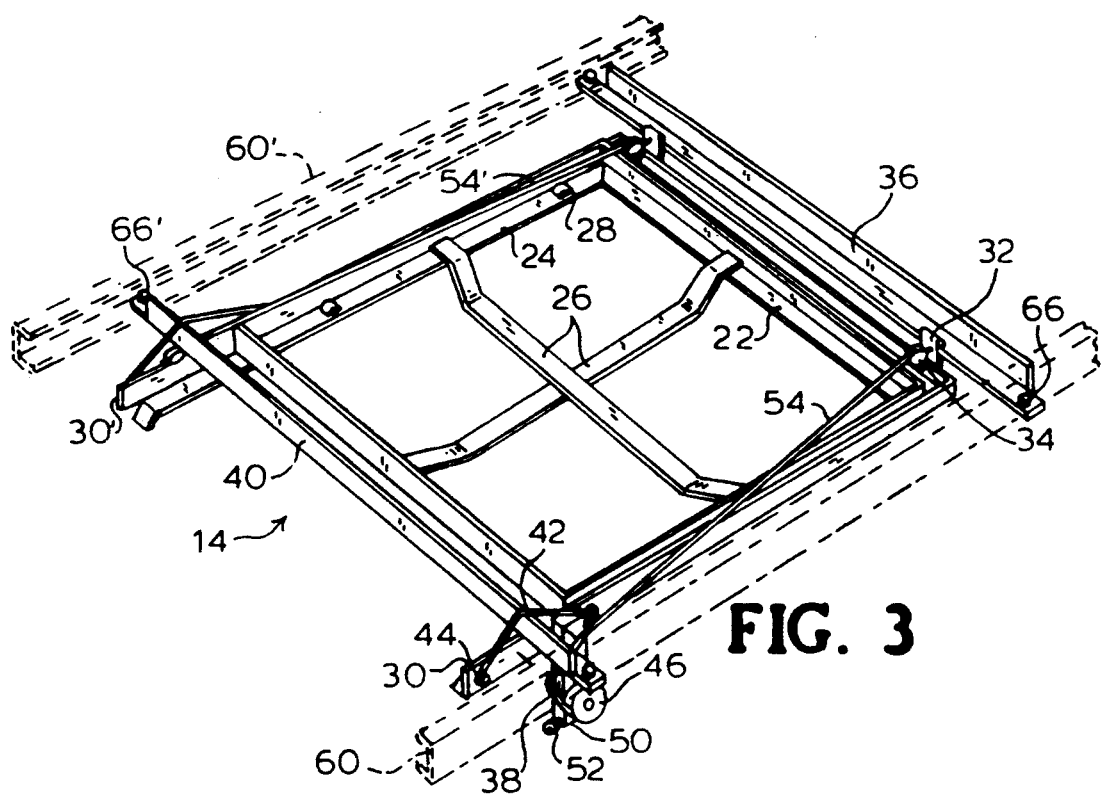
FIG. 3 is a perspective view of the tire storage apparatus of the invention in its upper position as seen from above with parts of the vehicle chassis shown in dashed lines.
Figure 6:
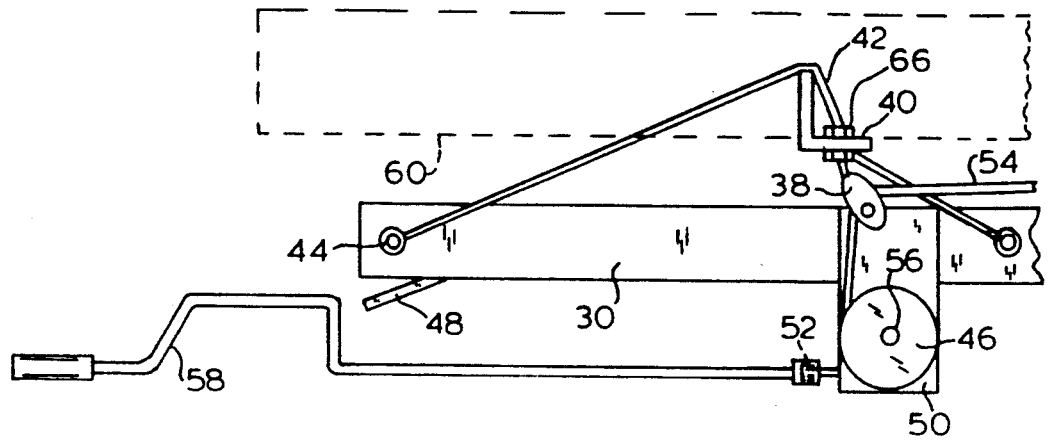
FIG. 6 is an enlarged segmental side elevation view of the cable lifting and safety arrangements of the invention.
Figure 7:
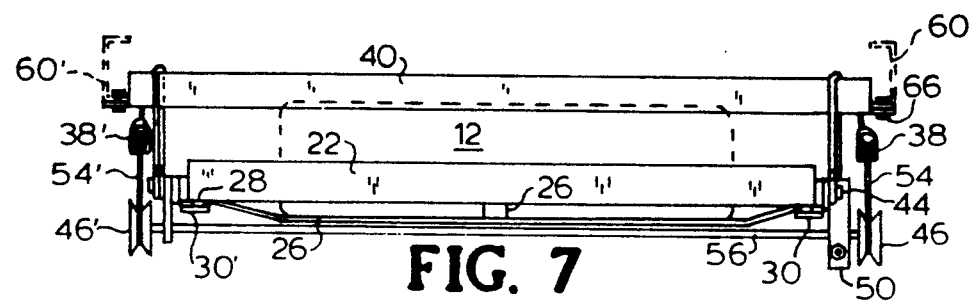
FIG. 7 is a rear elevation view of the apparatus of the invention as supported in its upper, tire storage position with portions of the vehicle frame shown in dashed lines.
Figure 8:
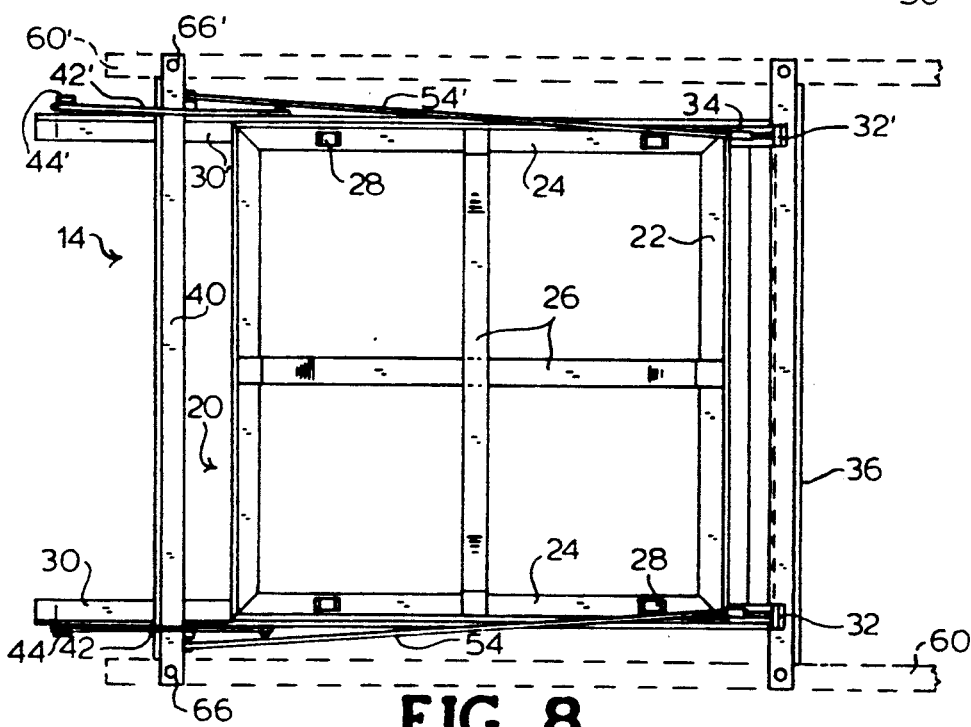
FIG. 8 is a top plan view of the tire storage apparatus of the invention with the supporting vehicle frame members shown in dashed lines.

A comparison of the tire storage apparatus 14 of the invention in its upper, storage position and its lowered, extended position is readily seen in greater detail in FIGS. 4 and 5. In FIG. 4, tire 12 is held in an upper stored position on tire carriage 20 with ramp 30 parallel to chassis side member 60. Each safety cable 42, 42' is detached from its safety hook 44. By using crank 58 (FIG. 6) to rotate drive stem 52 of gear box 50, tire 12 is lowered and extended to a position beyond the rear of vehicle 10. First, the rotation of stem 52 rotates reel 46 and releases each of a pair of cables 54, 54', allowing ramp 30, which is hingedly attached to forward support bar 36 at its front end, to be lowered at its rear end. As ramp 30 reaches its lowest position, restrained by having reached the maximum extension of the safety cables 42, 42', tire carriage 20 moves down the ramp 30 to an accessible position as seen in FIG. 5. As seen in FIGS. 3, 7, 8, cable 54 and safety cable 42 are located opposite the comparable respective cable 54' and safety cable 42' on the opposite side of tire storage apparatus 14.

A drawing of the tire storage apparatus 14 in perspective view is seen in FIG. 3 (without a tire for clarity). The tire would ordinarily rest on and be supported by metal formed tire support straps 26 which are curved upwardly near each end to form a cradle for the tire and allow sufficient space below the floor of the vehicle 10. Therefore, sufficient space is alloted to accommodate all tire sizes which would be normally expected to be used on a particular type vehicle. Since the spare tire is supported on support straps 26 and is contained laterally by the upwardly bent ends of straps 26 and the surrounding metal formed carriage side and cross frame members 22, 24 as well as the upper enclosure provided by the vehicle's floor, a tire securing means is not generally needed. However, means to anchor the tire into the tire support straps, such as a spring hook device may be used. Tire support straps 26 are fixedly attached at their respective ends to carriage cross frame members 22 and to carriage side frame members 24 by welding or other means. Similarly, carriage cross members 22 and carriage side members 24 are fixedly attached to each other at their mating corners. The combined assembly of tire support straps 26, carriage cross frame members 22 and carriage side frame members 24 comprises tire carriage 20. Tire carriage 20 slidingly engages a pair of ramps 30, 30' and slides thereupon aided by a plurality of carriage sliders 28. Carriage sliders 28 are preferred to be small diameter rollers mounted to side frame members 24 to support tire carriage 20 slightly above and in sliding relation to ramps 30, 30'. An alternate configuration for sliders 28 is to use low frictional pads, such as used for furniture gliders. Whereas it is recognized that a set of rollers functioning as sliders 28 will allow tire carriage 20 to move easily when working in clean conditions, it has been discovered that low friction pads tend to be clogged less by road dirt and ice. The invention apparatus thus adapts to use of either rollers or low friction pads.

FIG. 7 portrays a rear elevation of the tire storage apparatus of the invention. As shown in this view, reel 46 and counterpart reel 46' are mounted on each side of the apparatus and connected by shaft 56 to operate cooperatively. Simultaneously, shaft 56, with appropriate collars (not shown) fixed thereto, maintains space between bilateral ramps 30, 30' to keep substantial parallelism therebetween. Likewise, cables 54, 54', pulleys 38, 38', safety cables 42, 42', and safety hooks 44, 44' are bilateral and function similarly on each side.

Figure 10A:
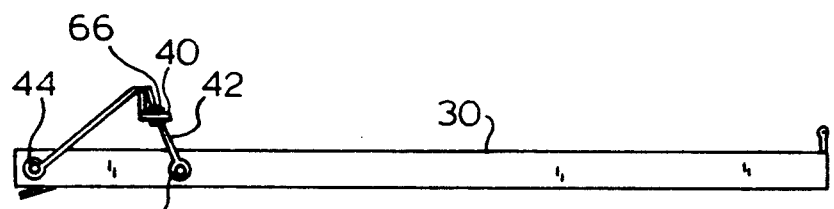
FIG. 10A is a side elevation view of the apparatus of the invention in its upper stored position and depicting the relationship of the safety cables to the apparatus.
Figure 10B:
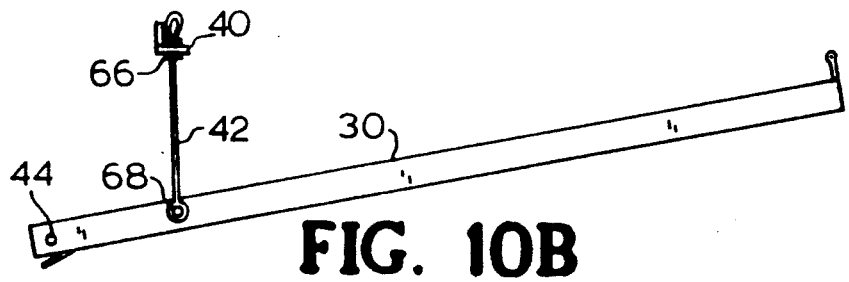
FIG. 10B is a side elevation view of the apparatus of the invention in its lowered position and showing the relation of the safety cables when extended.

As viewed from above in FIG. 8, with the vehicle and tire not shown, the tire storage apparatus 14 of the invention is seen. Tire carriage 20, made up of side frame members 24, cross frame members 22 and tire support straps 26 is slidably mounted on ramps 30, 30'. Sliders 28 aid in the freedom of movement of tire carriage 20 up and down ramps 30, 30'. The forward portion of spare tire storage apparatus 14 is hingedly supported by hinges 32; the rear portion is secured by safety cables 42, 42' which attach across chassis rear support bar 40 to safety hooks 44, 44' on either side of ramps 30, 30'. Other forms of securement than cables 42, 42' may be used to both hold tire storage apparatus 14 in its upper position and act as a stop to downward travel, as illustrated in FIGS. 10A, 10B.

The major components of apparatus 14 are constructed of either steel or aluminum angle and strap materials according to the preferred embodiment. An appropriate material for both safety cables 42, 42' and lift cables 54, 54' is $\frac{1}{8}$ inch diameter stainless steel twisted cable. The material choice for other components, such as hinges 32, sliders 28, etc. is variable according to the preference of the maker.

In further reference to FIG. 5, to attach the apparatus 14 to the chassis of a vehicle, the chassis is inspected to determine a location for rear support bar 40 so that the spare tire 12 will be as close as possible to a rear or side access point. The forward support bar 36, being initially separate from the balance of the apparatus 14, is then located in the proper relationship to the previously determined location for the rear support bar 40. The forward support bar 36 is then fixedly attached to chassis member 60 by bolts 66 or by welding. Forward ramp bar 31, previously welded to ramps 30, 30', is then lifted to bring the lower half of hinge 32 into engagement with the upper half of hinge 32 on forward support bar 36. The rear end of ramp member 30, 30' is lifted and held, along with rear support bar 40, while rear support bar 40 is fixedly attached to chassis member 60 by bolts 66 or by welding. Apparatus 14, having been previously assembled and adjusted is attached and ready to operate.

Figure 9:
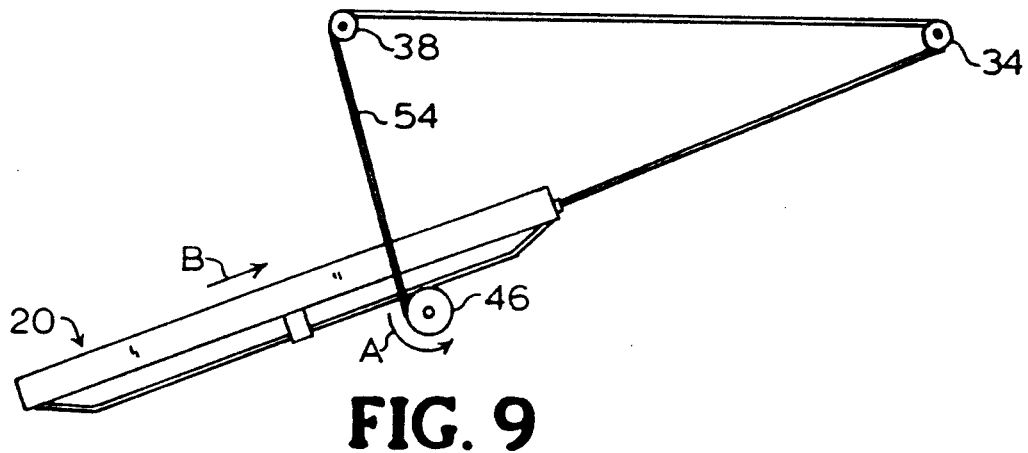
FIG. 9 is a side elevation schematic drawing of a cable and pulley portion of the invention apparatus operating on the spare tire carriage.

FIG. 9 illustrates the lift cable 54 in schematic form, without surrounding mechanism. As reel 46 is rotated in the direction indicated by arrow A, cable 54 is pulled through pulleys 38, 34 to wind onto reel 46. Tire carriage 20 is pulled angularly upward in the direction of arrow B until it contacts pulley 34, at which point continued winding of cable 54 lifts reel 46 (attached to hinged members, not shown) to finally rest just beneath upper pulley 38. It should of course be understood that the opposite cable 54' operates in a similar manner.

The operation of the tire storage apparatus 14 is accomplished with the novel and effective pulley and cable system as briefly outlined above. Downward motion occurs as the first step in a transition from the storage position shown in FIG. 4 to the lowered and extended position of FIG. 5. First, the user detaches safety cables 42, 42' from safety hooks 44, 44'. Then a device adapted to rotate drive stem 52 is attached thereto. The turning device could be a crank 58 (as illustrated in FIG. 6), a wheel, a motorized drive, etc. As drive stem 52 is turned, its rotation is transmitted through gearbox 50 to rotate reels 46, 46', on which reels 46, 46' a quantity of cable 54, 54' is wound. Reels 46, 46' turn and allow cables 54, 54' to unwind so that ramp 30, supported at its rear end by cables 54, 54' is gradually lowered until safety cables 42, 42' each of which has a collar clamped around its upper end to prevent passing through the hole in rear support bar 40, reaches the extent of its length and thereby stops the downward movement of ramp 30. This downward movement is sufficient to allow the largest tire which may be stored in carriage 20 to pass beneath the rear end of vehicle 10. At this time, tire carriage 20, being on an incline and bearing the weight of spare tire 12, moves down ramp 30 on sliders 28 as cable 54 continues to extend. Therefore, it will be understood that safety cables 42, 42' actually perform two functions, that of a safety lock when attached to safety hooks 44, 44' and that of a lowering stop for ramp 30 when not so attached. Tire carriage 20 slides downwardly along ramp 30 until cables 54, 54' reach the extent of their length and stop, at which point tire carriage 20 is at or close to the ground level and at a position somewhat beyond the rear of the vehicle. Once tire storage apparatus 14 is down and in its rearmost position, the vehicle user can remove any spring hook which may be holding tire 12 in place and lift the rear end of tire 12, and once upright, roll tire 12 off tire carriage 20.

To subsequently store a tire in the apparatus 14, one rolls the tire onto the lowered tire carriage 20 and places the tire onto tire support straps 26. If used, a spring hook is now attached to secure the position of tire 12. The crank 58 is attached to drive stem 52 and used to rotate reels 46, 46' by transmission of power through gearbox 50. As cables 54, 54' wind onto reels 46, 46', tire carriage 20 is pulled up along ramp 30. In order to raise sliders 28 smoothly, a downwardly bent ramp lip 48 portion of ramp 30 is provided. When tire carriage 20 has fully mounted ramp 30, cables 54, 54' cannot pull farther forwardly and begins to lift the rear end of ramp 30 to a position in which ramp 30 is parallel to chassis side member 60. The safety cables 42, 42' are then put over rear support bar 40 and fastened to safety hooks 44, 44', thus preventing the apparatus 14 from accidentally lowering. A secondary safety exists in that gearbox 50 has within it a worm gear and a pinion (not shown), so that it will not turn backwards due to tension of cables 54, 54' on reels 46, 46', but will only turn when rotation is imparted to drive stem 52.

Greater detail of the mechanism of the invention is illustrated in FIG. 6, a partial enlarged view. In this drawing, ramp 30 is in its upper storage position and safety cable 42, by way of example, passes through a hole in rear support bar 40 and is hooked over rear support bar 40 to safety hook 44. Cable 54 is wound primarily onto reel 46 to enable lowering and lifting ramp 30 by virtue of internal worm and pinion (not shown) in gearbox 50. Crank 58, illustrated in engagement with drive stem 52, is operative to motivate the mechanism through gearbox 50. It is to be understood that the opposite cables 42', 54' and reel 46' operate in a similar manner.

FIGS. 10A, 10B diagrammatically portray the dual functions of safety cable 42 in upper locked and lower extended positions respectively. When locked as in FIG. 10A, safety cable 42 is effectively shortened by being hooked over rear support bar 40 to safety hook 44. When in extended position, the full length of safety cable 42 prevents ramp 30 from lowering further, since the loop formed at the upper end of safety cable 42 will not pass through the hole in rear support bar 40. Safety cable 42' operates in a similar manner.

It is recognized that vehicles of different manufacturers and of different models have individual specifications for spacing between chassis members and beneath the body. Therefore, a certain amount of difference in size between various types of spare tire storage apparatus will be required. For the most part, a tire storage carriage that is large enough to accommodate the tire size for a particular vehicle will be small enough to fit between chassis members.

The specific preferred embodiment described herein is used as an example and is not intended to limit the scope or principles of the invention.

What is claimed as new is:

1. An apparatus for storing a spare tire beneath the body of a vehicle, comprising:
    (a) a ramp having a forward end and a rear end and being hingedly attached to forward and rearward extending chassis members of the vehicle;
    (b) a tire supporting carriage having a forward end and being in sliding engagement with said ramp and adapted to support said spare tire; and
    (c) actuating means operative to hingedly lower and raise said ramp and enable the sliding of said carriage along said ramp.

2. The apparatus for storing a spare tire beneath the body of a vehicle as claimed in claim 1, in which said actuating means comprises cable means having a first and a second end and connected at said first end to the rear end of said ramp so as to lower and raise the rear end and attached at said second end thereof to said forward end of said tire supporting carriage so as to allow said tire supporting carriage to slide along said ramp and having means to move said cable therebetween.

3. The apparatus for storing a spare tire as claimed in claim 2, further comprising reel means to move said cable means between the rear end of said ramp and the forward end of said carriage.

4. The apparatus for storing a spare tire as claimed in claim 2, in which said cable means is cable on each of two sides of said spare tire storing apparatus.

5. The apparatus for storing a spare tire as claimed in claim 3, further comprising sliding means mounted to said tire supporting carriage in such position as to facilitate the sliding of said carriage along said ramp.

6. The apparatus for storing a spare tire as claimed in claim 5, in which said sliding means comprises a plurality of rollers.

7. The apparatus for storing a spare tire as claimed in claim 5, further comprising a downwardly angled lip at the rear end of said ramp adapted to facilitate the sliding of said sliding means onto said ramp.

8. An apparatus for storing a spare tire beneath the body of a vehicle having chassis members below a rear portion thereof, comprising:

(a) a rectangular frame hingedly attached along an edge thereof to a selected portion of the chassis of said vehicle;
(b) a tire carriage adapted to support a spare tire and to slidingly ride within and along said frame in a direction perpendicular to the hinged edge;
(c) cable means having a first and a second end and being attached to said frame at said first end and being passed around a pulley adjacent said hinged edge with said second end of said cable attached to said tire carriage;
(d) a reel attached to said frame distal from said hinged edge and operative to wind or unwind said cable means when said reel is rotated;
(e) a reel driving mechanism operatively connected to said reel; and
(f) a safety catch attached to said frame at a position distal from said hinged edge adapted to prevent the accidental lowering of said frame and said tire carriage.

9. The apparatus for storing a spare tire as claimed in claim 8 in which said cable means is a pair of cables oriented substantially parallel to each other on opposite sides of said spare tire storing apparatus.

10. The apparatus for storing a spare tire as claimed in claim 8 in which said reel driving mechanism comprises a crank capable of being attached to said apparatus to actuate said cable means.

* * * * *

UNITED STATES PATENT AND TRADEMARK OFFICE
CERTIFICATE OF CORRECTION

PATENT NO. : 5,238,358
DATED : August 24, 1993
INVENTOR(S) : Betty W. Higgins, Wilson P. Higgins It is certified that error appears in the above-identified patent and that said Letters Patent is hereby corrected as shown below:

Column 7, line 11, insert --a-- after "is".

Signed and Sealed this

Twelfth Day of April, 1994

Attest:

BRUCE LEHMAN

Attesting Officer      Commissioner of Patents and Trademarks